United States Patent [19]

Baum

[11] 4,350,784

[45] Sep. 21, 1982

[54] LASER TRIMMABLE RESISTOR COATING

[75] Inventor: Karl F. Baum, Milwaukee, Wis.

[73] Assignee: North American Philips Corporation, New York, N.Y.

[21] Appl. No.: 260,561

[22] Filed: May 5, 1981

[51] Int. Cl.³ .............................................. C08K 5/06
[52] U.S. Cl. ..................................... 524/759; 524/317
[58] Field of Search ..................... 525/387; 260/33.2 R

[56] References Cited

U.S. PATENT DOCUMENTS

| 3,093,619 | 6/1963 | Taylor et al. | 525/387 |
| 3,579,484 | 3/1968 | Thomas | 525/387 |
| 4,251,423 | 2/1981 | Zamek | 260/33.2 R |

Primary Examiner—Joseph L. Schofer
Assistant Examiner—N. Sardfim
Attorney, Agent, or Firm—Norman N. Spain

[57] ABSTRACT

An abrasive resistant coating is provided for laser trimmable film resistor devices by use of heat-hardenable compositions containing a prepolymer of diallyl isophthalate or diallyl phthalate, an ether alcohol solvent, a heat-curing catalyst and an inert inorganic filler.

9 Claims, 1 Drawing Figure

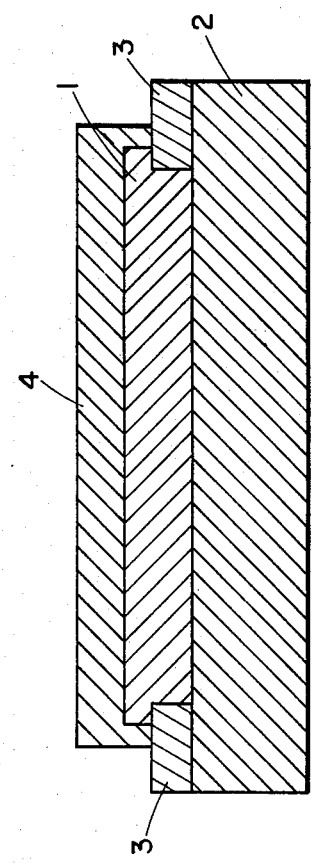

LASER TRIMMABLE RESISTOR COATING

BACKGROUND OF THE INVENTION

This invention relates to laser trimmable coatings for use in laser trimming of film resistors, methods of applying such coatings and to film resistor devices employing such coating.

During the production of film resistors which are suitable for high speed laser trimming it is highly desirable to protect the resistors particularly from abrasion during processing of the resistors. In order to accomplish this, laser trimmable protective coatings are frequently applied to the resistor. These coatings which are generally heat hardenable but which may be hardenable by use of ultraviolet or other types of radiation including light in the past have been formed of certain such materials as thermosetting phenolic resins and glass glazes. However the use of glass glazes has been found to provide inadequate abrasion protection resulting in decreased yields and to be costly. The phenolic coating also has been found to be undesirable as the laser trimming through such coating results in decreased resistability due to coating carbonization.

An object of this invention is to provide a new and novel laser trimmable coating composition for film resistors through which laser trimming may readily take place and which provides increased abrasive resistance for the resistor. An additional object of this invention is to provide a laser trimmable coating for film resistors that would permit of a considerable decrease in the cost of production of the resistors.

These and other objects of the invention will be apparent from the description that follows.

In the foregoing disclosure of the invention the term "laser trimming" refers to a method of adjusting the electrical resistance of a resistor by laser removal of resistor material until the desired resistance value is achieved. Such a technique is described for example in the E. I. Du Pont de Nemours and Company publication No. A-99397 (7/74) "Laser Trimming Techniques for Thick Film Resistors".

SUMMARY OF THE INVENTION

According to the invention the applicant has developed a new and novel laser trimmable coating composition for film resistors and new and novel film resistor employing this coating.

The novel laser trimmable coating of the instant invention is a heat hardenable translucent coating comprising a prepolymer of diallyl phthalate or diallyl isophthalate together with an ether alcohol solvent, a curing catalyst, such as t-butyl perbenzoate or t-butyl peroctate, a small amount of an inert inorganic filler and if desired a small amount of a dye. Preferably the solvent is Butyl Carbitol Acetate, a trademark for diethylene glycol monobutyl ether acetate, however other similar solvents may also be employed.

In general the mixture should contain from 20 to 75% by weight of the prepolymer, from 75% to 20% by weight of the solvent from ½% to 2% by weight of the catalyst and the remainder a mixture of the inert inorganic pigment and the dye.

Curing may be carried out either in air or in a nitrogen atmosphere.

In air, temperatures of 175° C. to 260° C. may be employed for about 5 minutes to two hours. In nitrogen temperatures of 325° C.–400° C. may be employed with similar heating times.

Heating and curing in a nitrogen atmosphere is particularly advantageous in that copper materials may be then employed as under these conditions copper materials are not subject to contamination by oxidation.

BRIEF DESCRIPTION OF THE DRAWING

The sole FIGURE in the drawing is an elevated view of a thin film resistor coated with the cured composition of the invention and suitable for laser trimming.

DETAILED DESCRIPTION OF THE INVENTION

The invention will now be described in greater detail with reference to the following example and the drawings.

A coating composition of the invention was prepared by the method as set out in the following example.

EXAMPLE 1

|  | Wt (in lbs.) |
|---|---|
| DAPON M (Diallyl Isophthalate Prepolymer Product of the FMC Corporation) | 27.95 |
| Butyl Carbitol Acetate | 47.90 |
| CABOSIL (Foamed Silica) | 3.5 |
| Combine with |  |
| *DYE PASTE | 1.7 |
| *DYE PASTE |  |
| Butyl Carbitol Acetate | 114.3 |
| CABOSIL | 10.5 |
| Blue Dye | 7.0 |

Blend together above ingredients and add, with mixing 1% by weight of a 50% mixture of t-butyl perbenzoate in dioctyl phthalate. Blend and mill until desired viscosity is achieved.

Referring to the FIGURE in the drawing, the resultant composition was then applied by screen printing in a thickness of 0.0004" to 0.0005" to a 0.8 mm thick bismuth resinate resistor 1 which had been applied by screen printing to an aluminum oxide substrate 2. Resistor 1 was also supported by and fused to noble metal conductive layers 3. The coating composition of Example 1 was applied by screen printing to this device so as to completely cover the resistor 1 and as well as the conductive layers 3. Curing was then carried out at one hour in air at about 200° C. As a result a hard translucent abrasive resistant laser trimmable coating 4 was formed completely covering the resistor 2 as well as the conductive metal layers 3.

This device which as well as similar film resistor devices having resistant values of 100 ohms per sq. or more were readily trimmable to tolerances of from ±5% to ±0.5% by use of a YAG laser with a q value of 4 to 7 and employing a power of approximately 1 to 3 watts.

Evaluations of the coating composition of the invention as compared to the glass glaze previously employed with and without the use of subsequently applied DUREZ coatings to similar film resistor devices all voltage stressed with 0.5 kv dc for final test were carried out. The results are shown in the following table.

TABLE 1

| GROUP | INITIAL TEST | | | FINAL TEST | | | Overall Yield |
|---|---|---|---|---|---|---|---|
| | Total Pcs. | Good Pcs. | Yield | Total Pcs. | Good Pcs. | Yield | |
| 3442 Glaze | | | | | | | |
| No Durez | 81 | 80 | 98.77% | 80 | 56 | 70% | 69.14% |
| Durez | 81 | 80 | 98.77% | 80 | 65 | 81.25% | 80.25% |
| 3934 Procoat | | | | | | | |
| No Durez | 81 | 80 | 98.77% | 80 | 78 | 97.5% | 96.30% |
| Durez | 81 | 80 | 98.77% | 80 | 80 | 100% | 98.77% |

The 3442 Glaze is Dupont's resistor Encapsultant 9137. This is a glass containing material which is fired at 500°+25° C. in air. 3934 Procoat is the coating composition of the invention. DUREZ is a phenolic resin plus an inorganic filler of the Hooker Chemical Corporation applied after laser trimming. The 3934 Procoat coating composition of the invention was applied and cured in the manner disclosed in the example. The 3442 Glaze was applied at a thickness of 0.004 to 0.0005 and fired in air at 500° C. for approximately 10 minutes at the peak temperature.

Besides the advantages of increasing the yield because of improved abrasive resistance, the coating composition of the invention results in a very significant cost savings both in the cost of the materials, and also due to the fact that the coating composition of the invention may be cured in a conveyorized oven in less time and with use of less energy than the 3442 Glaze which would requires heating in a kiln at a much higher temperature.

In addition since the coating composition of the inventions may be cured in nitrogen, copper conductors may be employed thus eliminating the need for noble metal conductors.

Further the coating composition of the invention is considered to be advantageous over the laser trimmable coating composition described in U.S. Pat. No. 4,144,673 in that unlike the coating composition disclosed therein, the instant coating composition is an integral part of the finished product and not only does it provide excellent abrasive protection and as result higher yields of the device but also provides solder masking to prevent soldering of conductors in selected areas as well as providing protection for other elements of the circuitry. These results are not achieved by this coating composition patent.

These and other advantages of the instant invention will be apparent to those skilled in the art.

What is claimed is:

1. For use as a heat cureable coating for forming an abrasive resistance protective coating for laser trimmable resistor devices, a composition consisting essentially of a mixture of a prepolymer selected from the group consisting of a diallyl isophthalate prepolymer and a diallyl phthalate prepolymer, both prepolymers being homopolymers, an ether alcohol solvent, a catalyst selected from the group consisting of t-butyl perbenzoate and t-butyl peroctate and an inert inorganic pigment.

2. The coating composition of claim 1 wherein there is present from 20-75 parts by weight of the diallyl ester prepolymer, from 75 to 20 parts by weight of the ether alcohol solvent and from $\frac{1}{2}$ to 2% by weight of the catalyst.

3. The coating composition of claim 2 wherein the ether alcohol solvent is diethylene glycol monobutyl ether acetate.

4. The coating composition of claim 3 wherein the pigment is silica.

5. The coating composition of claim 4 wherein there is present 26 to 29 parts by weight of the prepolymer, 45 to 50 parts by weight of the ether alcohol solvent, $\frac{1}{2}$% to 1% by weight of the catalyst and 2 to 5 parts by weight of the silica.

6. A method of providing a film resistor device with a laser trimmable abrasive resistant coating comprising applying to said device a coating composition of claims 1, 2, 3, 4 or 5 in a manner so as to at least cover the film resistor portions of said device, and then curing said coating composition by heating said device in air at a temperature of 175° C. to 260° C.

7. A method of providing a film resistor device with a laser trimmable abrasive resistant coating comprising applying to said device a coating composition of claims 1, 2, 3, 4 or 5 in a manner so as to at least cover the film resistor portions of said device, and then curing said coating composition by heating said device in nitrogen at a temperature of 325° C. to 400° C.

8. A laser trimmable film resistor device coated with an abrasive resistant heat-hardened coating composition provided by the method of claim 6.

9. A laser trimmable film resistor device coated with an abrasive resistant heat-hardened coating composition provided by the method of claim 7.

* * * * *